(12) United States Patent
Wills (10) Patent No.: US 7,478,527 B2
(45) Date of Patent: Jan. 20, 2009

(54) APPARATUS, SYSTEM, AND METHOD FOR ESTIMATING PARTICULATE PRODUCTION

(75) Inventor: J. Steve Wills, Columbus, IN (US)

(73) Assignee: Cummins, Inc, Columbus, IN (US)

( * ) Notice: Subject to any disclaimer, the term of this patent is extended or adjusted under 35 U.S.C. 154(b) by 191 days.

(21) Appl. No.: 11/227,857

(22) Filed: Sep. 15, 2005

(65) Prior Publication Data

US 2007/0056274 A1    Mar. 15, 2007

(51) Int. Cl.
*F01N 3/00* (2006.01)

(52) U.S. Cl. .............................. 60/295; 60/274; 60/276; 60/297; 60/311

(58) Field of Classification Search .................. 60/274, 60/276, 278, 295, 297, 311
See application file for complete search history.

(56) References Cited

U.S. PATENT DOCUMENTS

| | | | |
|---|---|---|---|
| 6,405,528 B1 | 6/2002 | Christen et al. | 60/295 |
| 6,622,480 B2 | 9/2003 | Tashrio et al. | 60/295 |
| 6,756,904 B2 | 6/2004 | Kinugawa et al. | 340/606 |
| 6,758,039 B2 * | 7/2004 | Kuboshima et al. | 60/311 |
| 6,829,889 B2 | 12/2004 | Saito et al. | 60/291 |
| 6,829,890 B2 | 12/2004 | Gui et al. | 60/295 |
| 6,854,265 B2 | 2/2005 | Saito et al. | 60/295 |
| 6,907,873 B2 | 6/2005 | Hamahata | 123/676 |
| 6,951,100 B2 * | 10/2005 | Kuboshima et al. | 60/311 |
| 7,208,029 B2 * | 4/2007 | Shirakawa et al. | 95/273 |
| 2002/0196153 A1 | 12/2002 | Kinugawa et al. | 340/606 |
| 2003/0167757 A1 | 9/2003 | Boretto et al. | 60/295 |
| 2004/0172933 A1 | 9/2004 | Saito et al. | 60/277 |
| 2004/0204818 A1 | 10/2004 | Trudell et al. | 701/114 |
| 2005/0198945 A1 * | 9/2005 | Okugawa et al. | 60/295 |

* cited by examiner

*Primary Examiner*—Thomas E Denion
*Assistant Examiner*—Diem Tran
(74) *Attorney, Agent, or Firm*—Kunzler & McKenzie (57) ABSTRACT

An apparatus, system, and method are disclosed for estimating particulate production from a diesel engine. Engine conditions such as fuel rate, exhaust gas recirculation, and fuel injection timing are determined. Based on empirical evidence or theoretical calculations, or both, particulate production markers, each indicating a level of particulate production, are assigned to each engine condition. The markers are combined and the combined marker is used to interpolate between a minimum and a maximum level of particulate production from the engine to estimate a particulate production rate. The production rate may be combined with an oxidation rate to determine a particulate accumulation rate, which may in turn be combined with a particulate load estimate to produce a combined particulate load estimate. The combined estimate may be used to determine whether to initiate regeneration of a diesel particulate filter.

23 Claims, 11 Drawing Sheets

APPARATUS, SYSTEM, AND METHOD FOR ESTIMATING PARTICULATE PRODUCTION

BACKGROUND OF THE INVENTION

1. Field of the Invention

This invention relates to feedback systems, and more particularly to apparatuses, systems and methods for estimating particulate production from diesel engines.

2. Description of the Related Art

Environmental concerns have motivated the implementation of emission requirements for internal combustion engines throughout much of the world. Governmental agencies, such as the Environmental Protection Agency ("EPA") in the United States, carefully monitor the emission quality of engines and set acceptable emission standards, to which all engines must comply. Generally, emission requirements vary according to engine type. Emission tests for compression-ignition or diesel engines typically monitor the release of diesel particulate matter (PM), nitrogen oxides ($NO_x$), and unburned hydrocarbons (HC). A critical emission of gasoline or other stoichiometric engines is carbon monoxide (CO). Catalytic converters have been implemented in exhaust gas after-treatment systems for spark-ignition engines, eliminating many of the pollutants present in exhaust gas, though historically such aftertreatment systems have not been added to diesel engines. However, to remove diesel particulate matter, typically a diesel particulate filter, herein referred to as a filter, must be installed downstream from a catalytic converter or in conjunction with a catalytic converter.

A common filter comprises a porous ceramic matrix with parallel passageways through which exhaust gas passes. Particulate matter accumulates on the surface of the filter, creating a buildup that must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, which is refractory and not easily wiped away, can be oxidized and driven off of the filter in a process called regeneration. In most applications soot accumulates much faster than ash, to the extent that an estimate of the rate of soot accumulation is substantially equivalent to an estimate of the rate of total particulate accumulation.

Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system that can impair engine performance. Particulate matter, in general, oxidizes in the presence of $NO_2$ at modest temperatures, or in the presence of oxygen at higher temperatures. Excessive soot buildup on the filter can precipitate uncontrolled regeneration of a particulate filter, or, in other words, cause rapid oxidation rates resulting in higher than designed temperatures within the filter. Recovery can be an expensive process.

To prevent potentially hazardous situations, it is desirable to oxidize accumulated particulate matter in a controlled regeneration process before it builds to excessive levels. Partial regeneration can contribute to irregular distribution of particulate matter across the substrate of a particulate filter.

Controlled regeneration traditionally has been initiated at set intervals, such as distance traveled or time passed, but that has proven to be ineffective. Regenerating a particulate filter with little or no particulate buildup lessens the fuel economy of the engine and unnecessarily exposes the particulate filter to destructive temperature cycles, and if particulate matter accumulates significantly before the next regeneration, backpressure from blockage of the exhaust flow can negatively affect engine performance. In addition, regeneration (intentional or unintentional) of a particulate filter containing large quantities of particulate buildup can become uncontrolled and potentially cause filter failure or the like. Consequently, many particulate filters regenerated on a set interval must be replaced frequently to maintain the integrity of an exhaust gas after-treatment system.

Recently, attempts have been made to estimate the amount of particulate matter accumulated in a particulate filter in order to respond more efficiently to actual particulate buildup.

In one method, the backpressure measured across a particulate filter by a differential pressure sensor or algorithm is used to estimate diesel particulate matter accumulation. The soot in the particulate filter may be burned off during regeneration to reduce backpressure in response to a differential pressure-based estimate of the amount of particulate accumulation.

In many cases, however, differential pressure alone is an unsatisfactory gauge of actual particulate accumulation due to unaccounted-for variations in engine operating conditions, sensor noise-to-measurement levels, exhaust flow estimate errors, reduced reliability at low exhaust flows, and unevenly-distributed particulate accumulation.

Other methods apart from differential pressure sensors have been developed to predict particulate accumulation, some of these comprising estimation or prediction models relating to known physical-chemical characteristics of the system and empirical data relating to engine operating conditions, mileage, driving style, terrain, and other factors. Existing models have been unsatisfactory in several respects, however, including poorly estimating particulate matter output, especially over time. Further, many empirical matches of particularized data sets end up with nonsensical coefficients contributing to the model; for example, a relationship between an operating parameter and the engine soot output might be reversed from the theoretical understanding. These effects reduce the ability to use a model in a broad set of applications From the foregoing discussion, it should be apparent that a need exists for an apparatus, system, and method for estimating or predicting particulate output from a diesel engine. Beneficially, such an apparatus, system, and method would contribute to effective and timely regeneration of a diesel particulate filter based on a more accurate estimate of soot accumulation, increasing the fuel economy of the vehicle, extending the life expectancy of the particulate filter, and increasing the overall efficiency of the engine.

SUMMARY OF THE INVENTION

The present invention has been developed in response to the present state of the art, and in particular, in response to the problems and needs in the art that have not yet been fully solved by currently available particulate estimation methods. Accordingly, the present invention has been developed to provide an apparatus, system, and method for determining particulate output that overcome many or all shortcomings in the art.

In one aspect of the invention, an apparatus to estimate the rate of particulate produced from an engine includes a conditions module configured to determine the status of at least one engine operating condition, a marker module configured to determine a particulate production marker corresponding to the operating condition status, and an interpolation module configured to interpolate between a high particulate production rate of the engine and a low particulate production rate of the engine according to the particulate production marker, thereby estimating the engine's rate of particulate production.

In one embodiment, the particulate production marker is a normalized particulate production rate, and the high particulate production rate is the engine's maximum particulate production rate. The low particulate production rate is the engine's minimum particulate production rate. A plurality of engine operating conditions may be assigned markers in one embodiment, with the markers being combined before interpolation.

In a further aspect of the invention, a method for estimating the rate of particulate produced by a diesel engine comprises determining the status of at least one engine operating condition, determining a particulate production marker corresponding to the engine operating condition status, and interpolating between a high particulate production rate and a low particulate production rate as a function of the particulate production marker to determine a particulate production rate.

In a further aspect of the invention, a diesel engine and exhaust system comprises a diesel engine, an exhaust system including a diesel particulate filter operatively connected to the engine, and a controller. The controller comprises a conditions module, configured to determine the status of at least one engine operating condition, and a particulate production module. The particulate production module includes a marker module configured to determine a marker denoting engine particulate production as a function of the engine operating condition status. The particulate production module further includes an interpolation module configured to interpolate between a high particulate production rate and a low particulate production rate according to the particulate production marker to determine a primary particulate production rate.

In one embodiment, the exhaust system of the invention further includes a filter regeneration mechanism. The controller includes an oxidation module configured to estimate the rate of oxidation of particulate matter on the filter and a particulate accumulation module configured to calculate a particulate accumulation rate by combining the particulate production rate and the rate of oxidation. A particulate load module is included to estimate the load of particulate on the filter, and a combined particulate load module generates a combined particulate load estimate by combining the particulate accumulation rate and the particulate load. An output module directs the regeneration mechanism to initiate regeneration of the filter according to the combined particulate load estimate.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
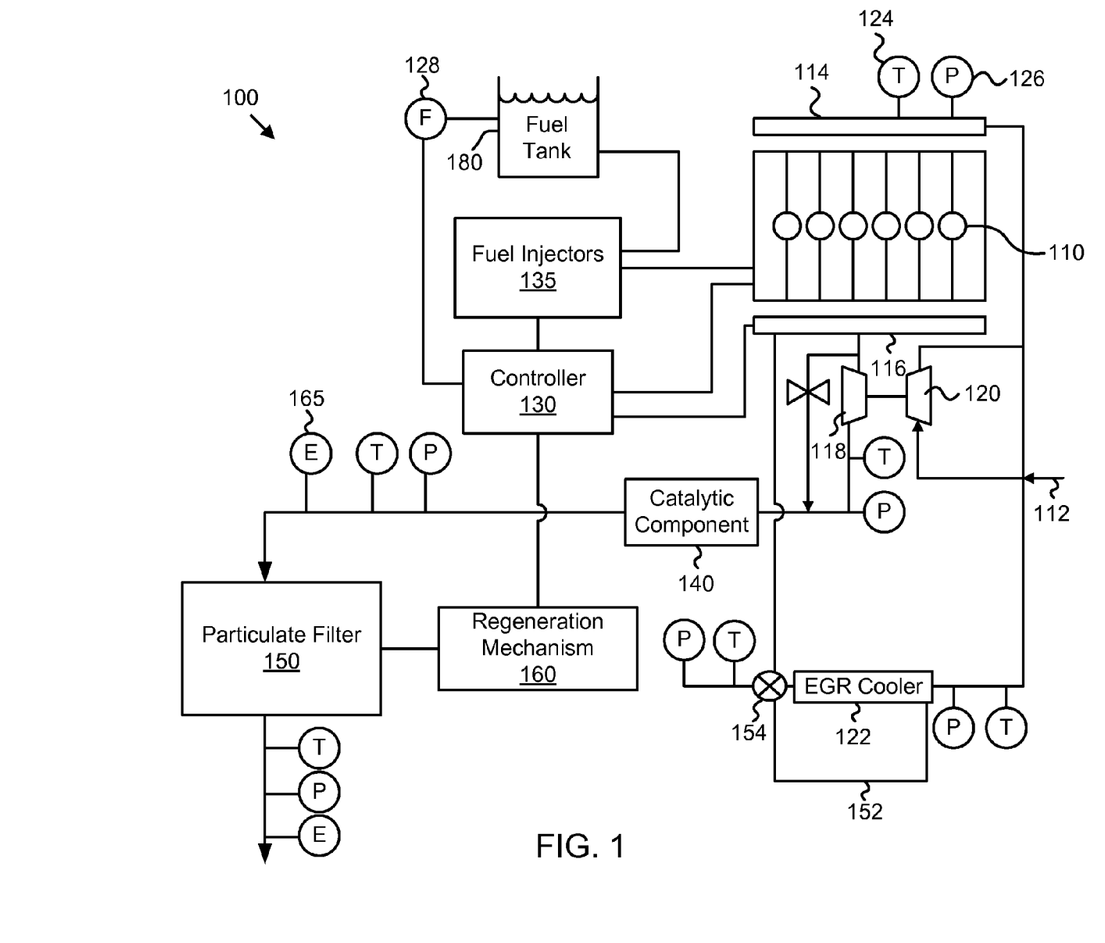
FIG. 1 is a schematic block diagram illustrating one embodiment of a diesel engine and exhaust system according to the present invention.

FIG. 1 depicts one embodiment of an internal combustion engine system, such as diesel engine system 100, in accordance with the present invention. As illustrated, the engine system 100 may include a diesel engine 110, a controller 130, fuel injectors 135, catalytic component 140, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, temperature sensors 124, pressure sensors 126, and fuel sensors 128. In one embodiment, the air inlet 112 is vented to the atmosphere, enabling air to enter the engine system 100. The air inlet 112 may be connected to an inlet of the intake manifold 114. The intake manifold 114 includes an outlet operatively coupled to the combustion chambers of the engine 110. Within the engine 110, compressed air from the atmosphere is combined with fuel to power the engine 110, which comprises operation of the engine 110. The fuel comes from the fuel tank 180 through a fuel delivery system including, in one embodiment, a fuel pump and common rail (not shown) to the fuel injectors 135, which inject fuel into the combustion chambers of the engine 110. The timing of the fuel injection is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140 to further reduce the number of pollutants. A regeneration mechanism 160 regenerates the filter 150, timing and extent of regeneration being controlled by the controller 130.

Particulate matter produced by the engine 110 comprises ash and soot. Soot accumulates much faster than ash, such that, in one embodiment, an estimate of the rate of total particulate accumulation can be satisfactorily generated by estimating the rate of soot accumulation, treating the ash accumulation rate as negligible.

Some amount of the exhaust gas may be re-circulated to the engine 110, according to a proportion set by the controller 130. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Various sensors, such as temperature sensors 124, pressure sensors 126, fuel sensor 128, exhaust gas flow sensors 165, and the like, may be strategically disposed throughout the engine system 100 and may be in communication with the controller 130 to monitor operating conditions. In one embodiment, the fuel sensor 128 senses the amount of fuel consumed by the engine, and the exhaust gas flow sensors 165 sense the rate at which exhaust gas is flowing at the particulate filter 150.

Engine operating conditions can be ascertained from any of the sensors or from the controller 130's commands to the engine regarding the fraction of exhaust gas recirculation, injection timing, and the like. In one embodiment, information is gathered regarding, for example, fueling rate, engine speed, engine load, the angle at which injection timing is advanced or retarded, time passed, fraction of exhaust gas recirculation, driving conditions, whether and when regenerations have occurred and the rate such regenerations have removed particulate matter, etc.

One way of estimating the amount of particulate matter accumulated on a diesel particulate filter such as the filter 150, to determine whether regeneration has occurred or is needed, is to use information regarding the pressure differential over the filter 150 as ascertained by a sensor or series of sensors such as pressure sensors 126, and the rate of exhaust gas flowing from the engine as ascertained by a sensor or series of sensors such as the exhaust gas flow sensor 165. That estimation method is further detailed in related patent application Ser. No. 11/227,828, "APPARATUS, SYSTEM, AND METHOD FOR ESTIMATING ASH ACCUMULATION," and application Ser. No. 11/227,320, "APPARATUS, SYSTEM, AND METHOD FOR PROVIDING COMBINED SENSOR AND ESTIMATED FEEDBACK," each of which are incorporated herein by reference.

Generally, the rate of ash production is very small compared to the rate of soot production; therefore, as a practical matter in many instances, soot production and particulate production can be seen as being substantially equivalent, with references to "soot production" being read as "particulate production," and vice versa.

The engine 110 will produce soot and ash at a rate that will vary according to the type of engine it is; for example, whether it is an 11-liter or 15-liter diesel engine. Additionally, the rate of particulate production will vary according to engine operating conditions such as fuel rate, exhaust gas recirculation (EGR) fraction, and timing of fuel injection into the cylinders (SOI, or start of injection). Other factors may also bear on the particulate production rate. The relationship between these engine operating conditions and particulate production can be ascertained by empirical evidence gathered in the laboratory or in the field, or by theoretical calculations. The relationship of some of the operating conditions to particulate production will depend heavily on engine platform being considered, while others will be closer to platform-independent.

Figure 2A:
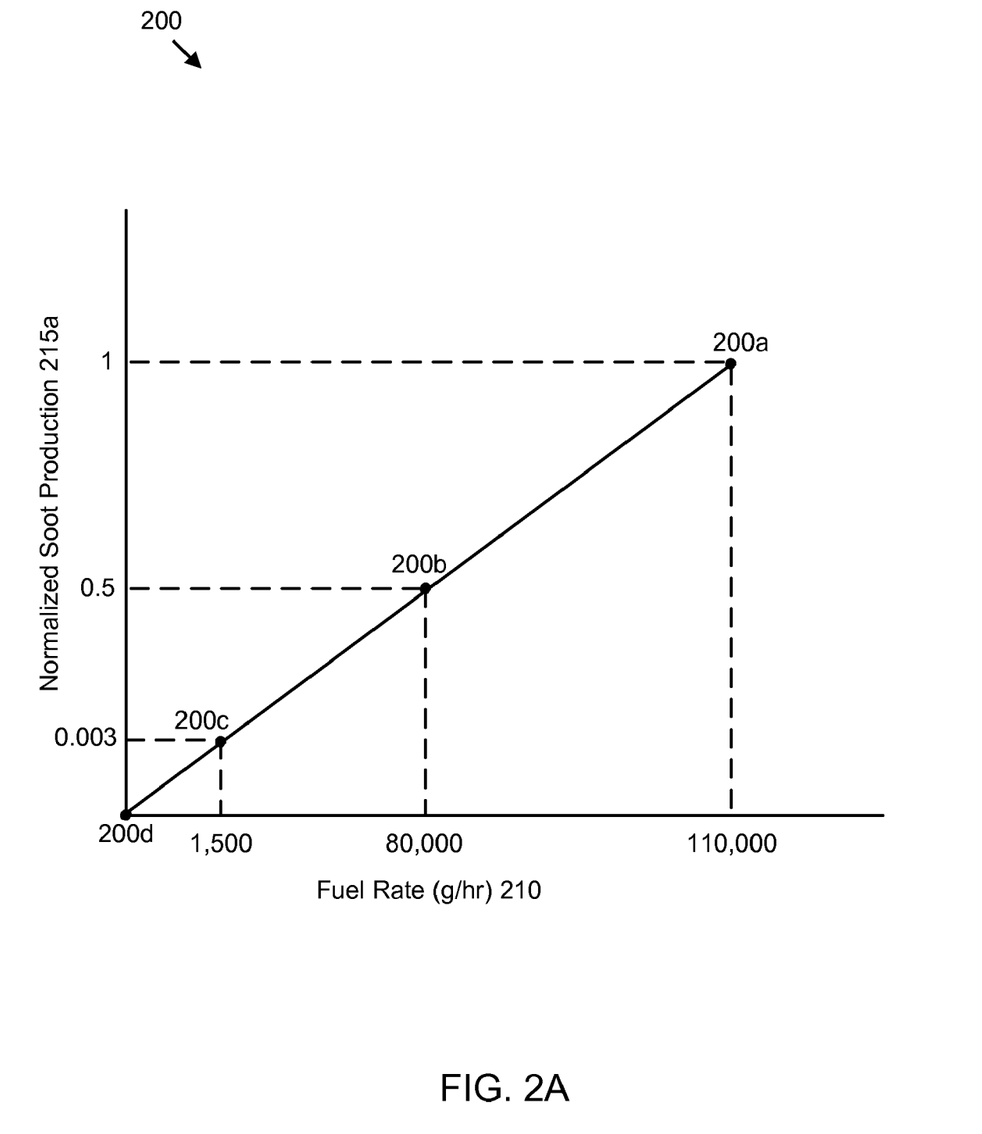
FIG. 2A is a graph illustrating one example of the relationship between diesel fuel rate and soot production according to the present invention.

FIG. 2A illustrates the function relationship 200 of one engine operating condition, the fuel rate 210, to engine soot production 215a, based on empirical evidence from a 15-liter diesel engine platform. The fuel rate 210 can be arrived at by multiplying engine speed by total fuel consumed or by other means that will be apparent to those skilled in the art. The soot production 215a is normalized—that is, in one embodiment, the soot production 215a has a minimum of zero, corresponding to a minimum soot production rate on the particular engine 110, and a maximum of 1.0, corresponding to a maximum soot production rate on the engine 110. The normalized soot production 215a may be viewed as a marker, an indication of a point between minimum and maximum soot production.

Even a normalized soot production value 215a can go higher than 1.0 in certain circumstances. The invention may initially be applied to a particular series of engines, for example, and later an engine might be released from that series with a higher fueling limit but with all other parameters substantially the same. In that case, the soot production parameter 215a could simply be allowed higher than 1.0.

In one embodiment, the engine 110 has a maximum fueling rate of 110,000 grams per hour, shown on point 200a in the function 200. Point 200a thus corresponds to a maximum normalized soot production 215a of 1.0, which in turn corresponds to a maximum engine soot production rate—20 grams per hour, in one embodiment.

At the point 200d in function 200, both the fuel rate 210 and the normalized soot production 215a are zero, corresponding to zero soot production. Point 200c shows the engine 110 idling, with a fuel rate of 1,500 grams per hour, corresponding to a normalized soot production 215a of 0.003, which in turn in one 15-liter engine embodiment corresponds to a soot production rate of 3 grams per hour. Point 200b indicates a fuel rate 210 of 80,000 grams per hour and a corresponding normalized soot production of 0.5, which in turn, in one 15-liter engine embodiment, corresponds to a soot production rate of 11.5 grams per hour.

As will be apparent in light of this disclosure, the function 200 and other functions described herein of engine operating conditions/soot production relationships may vary both quantitatively and qualitatively depending on the type, size, make, and model of engine and the empirical evidence gathered or theoretical considerations used for that particular engine.

Figure 2B:
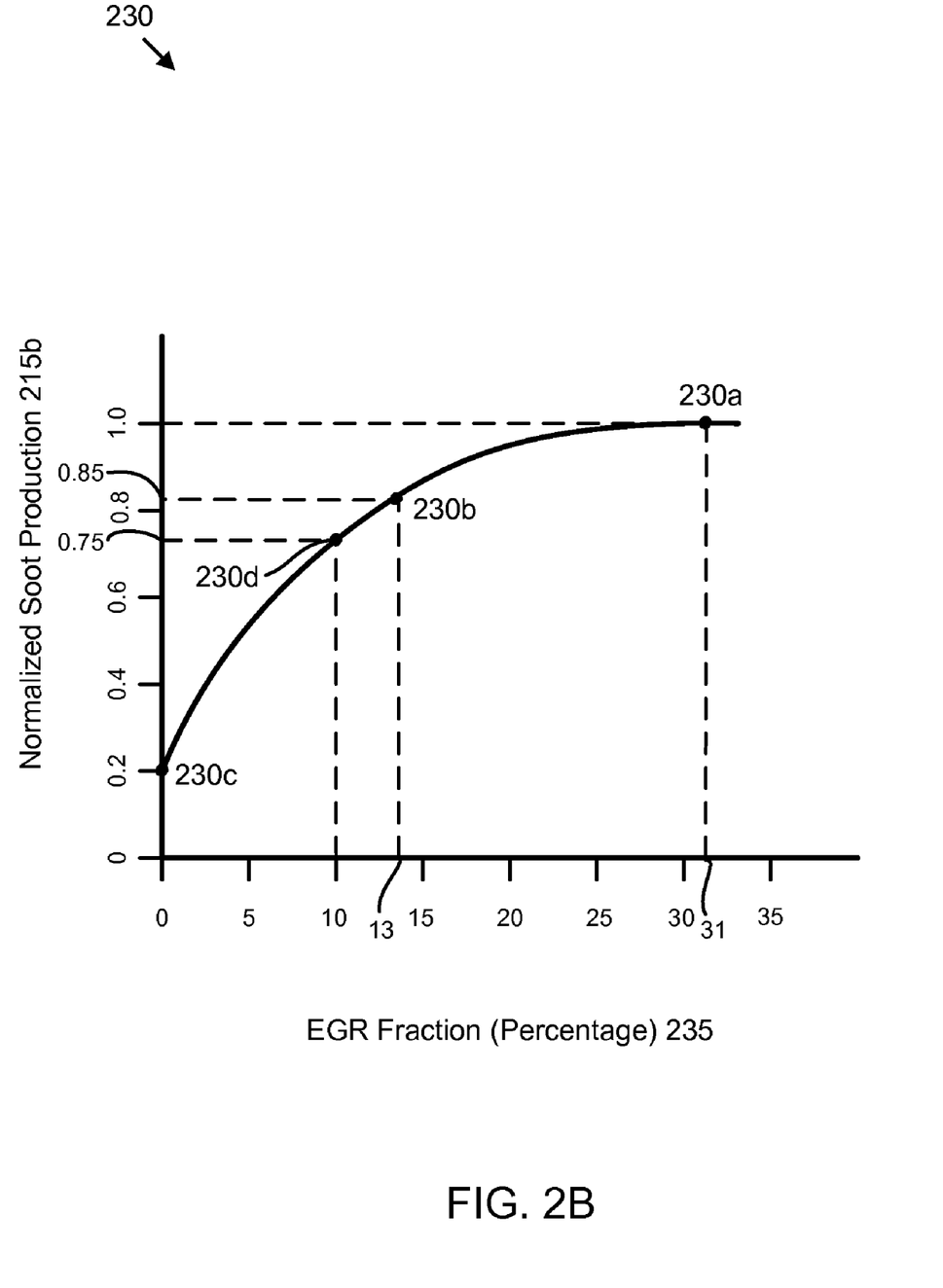
FIG. 2B is a graph illustrating one example of the relationship between engine gas recirculation and soot production according to the present invention.

FIG. 2B shows the normalized soot production 215b as a function of the fraction of exhaust gas recirculation 235 employed by the engine 110, i.e., the fraction of total gas contained in the intake manifold 114 that constitutes recirculated exhaust gas 235. In FIG. 2B, the EGR fraction 235 is shown as a percentage of total gas in the intake manifold 114.

It can be seen that, while the relationship 200 between fuel rate 210 and normalized soot production 215a shown in FIG. 2A is substantially linear, the function relationship 230 between the EGR fraction 235 and the normalized soot production 215b is not. Again, the function 230 can be ascertained by empirical evidence as well as theoretical considerations. For one embodiment of a diesel engine 110 such as a 15-liter engine, the point 230a of function 230 indicates an EGR fraction 235 of 31 percent, corresponding to a 1.0 normalized soot production value 215b—maximum soot production, in other words. Higher EGR fractions 235 as well as more exact empirical evidence may indicate other values 215b. Further, a hardware change, for example an EGR mechanism which is sourced downstream of a soot filter rather than upstream, may change this relationship considerably. An experimental sweep of EGR fraction 235 at various operating conditions can quickly determine the relationship for a given hardware configuration.

In one embodiment, empirical evidence indicates that the soot production 215b is not heavily affected by changes in the EGR fraction 235 between 13 percent (point 230b) and 31 percent (point 230a), the normalized soot production changing only from 0.85 to 1.0 between those two points. Between 10 percent and zero percent EGR fraction, however, the soot production 215b changes substantially, from 0.75 normalized soot production 215b (point 230d) to 0.2 (point 230c).

Figure 2C:
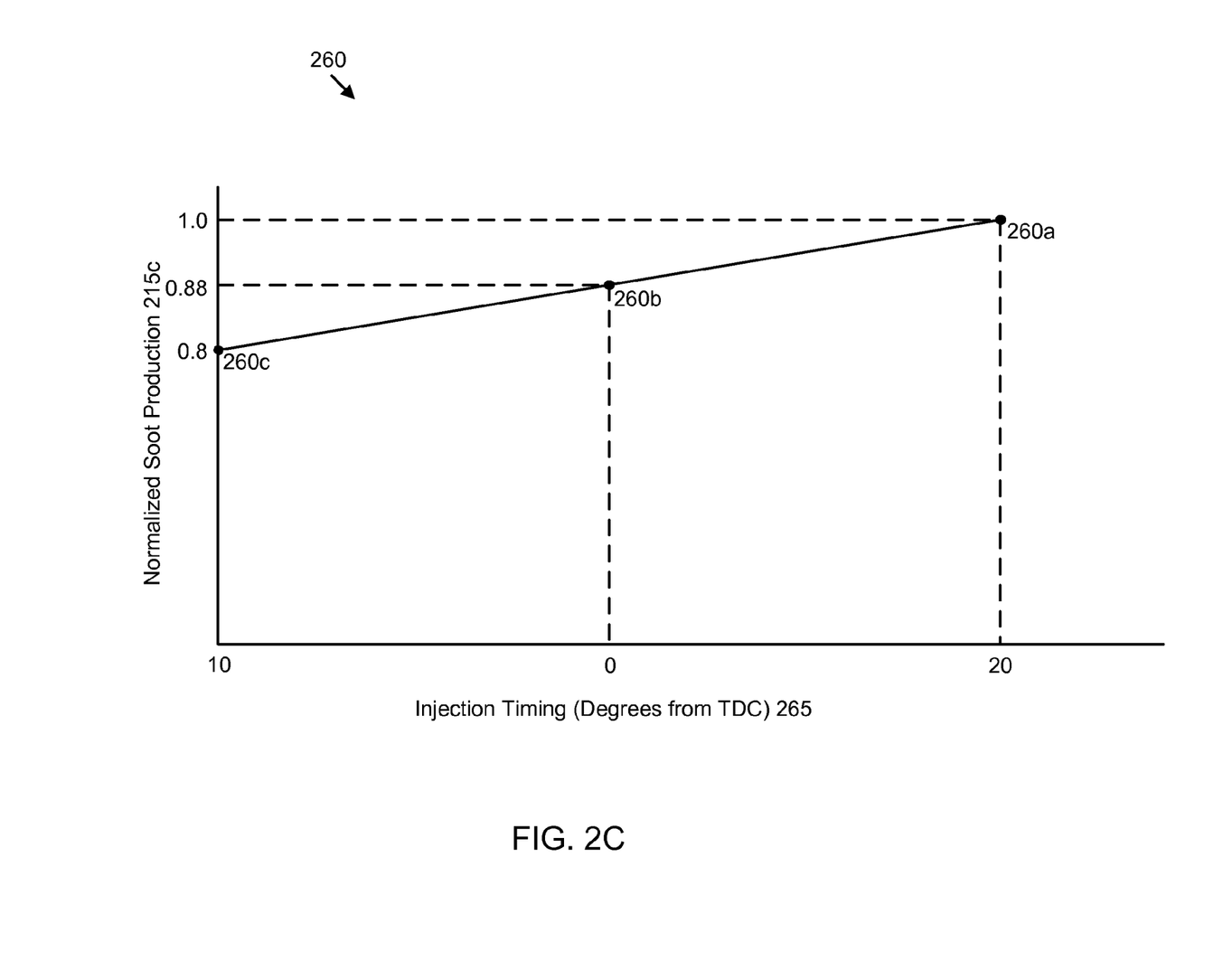
FIG. 2C is a graph illustrating one example of the relationship between ignition timing and soot production according to the present invention.

FIG. 2C shows a function relationship 260, again based on empirical evidence for a particular 15-liter diesel engine 110, of injection timing or SOI (start of injection) 265 with normalized soot production 215c. The injection timing 265 is indicated relative to the start of fuel injection into a cylinder when the piston is at the top of its upward movement in the cylinder, known in the art as top dead center. At a point 260a in the function 260, the start of injection 265 is carried out when the piston is 20 degrees retarded from top dead center, i.e., when the piston has reached the top of its upward movement and is 20 degrees on its way down again, according to the circular motion of the crankshaft. In one embodiment, the injection timing 265 at the point 260a corresponds to a 1.0 normalized soot production value 215c, or maximum soot production. At a point 260b, with zero degrees injection timing 265, or the start of injection occurring at top dead center, the normalized soot production 215c is 0.88. At a point 260c, when the injection timing 265 is 10 degrees advanced (that is, while the piston is still making its way to the top position), the normalized soot production 215c is 0.80. Further and/or more accurate values can be obtained through empirical data gathering or theoretical considerations. An engine which has different combustion characteristics from a previously calibrated engine, including piston bowl shape, displacement, and fuel system, should have a timing sweep performed to confirm the soot-timing relationship for that engine.

Figure 3:
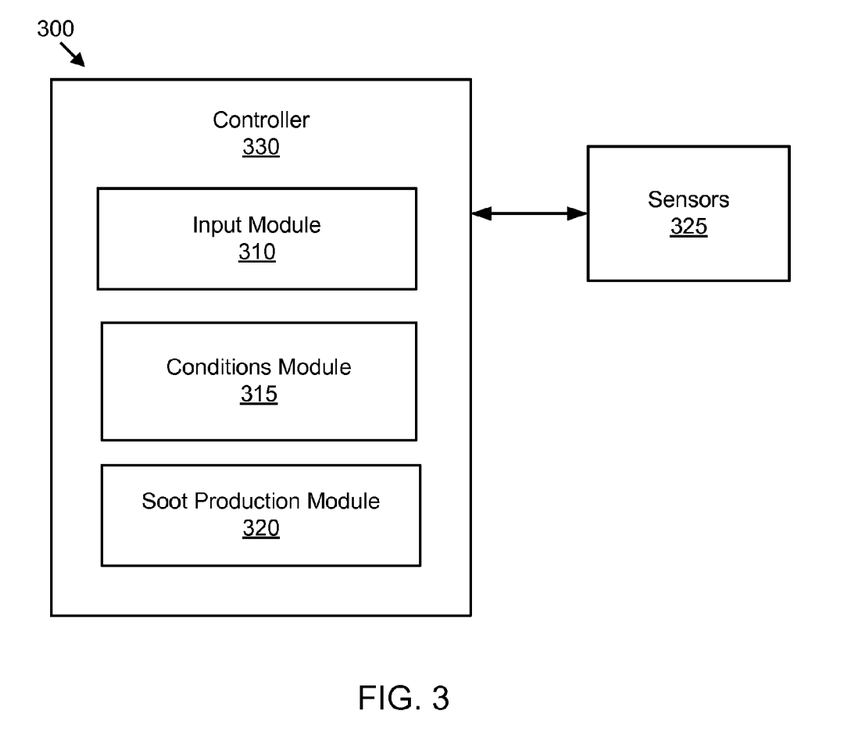
FIG. 3 is a schematic block diagram illustrating one embodiment of a control system according to the present invention.

FIG. 3 shows one embodiment of a control system 300 according to the present invention. A controller, which in one embodiment may be a controller 330 similar in configuration to the controller 130, contains an input module 310, a conditions module 315, and a soot production module 320. Engine sensors 325 communicate with the controller 130.

As is known in the art, the controller 330 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

The sensors 325 may include the temperature sensors 124, pressure sensors 126, fuel sensor 128, exhaust gas sensor 165 and other sensors monitoring engine operating conditions. The input module 310 is configured to input data from the sensors 325, and the conditions module 315 is configured to determine engine operating conditions using data from the input module 310 and/or operating conditions such as injection timing 265 or exhaust gas recirculation 235 imposed on the engine 110 by the controller 330. The soot production module 320 is configured to estimate the rate at which the engine 110 is producing soot.

Figure 4:
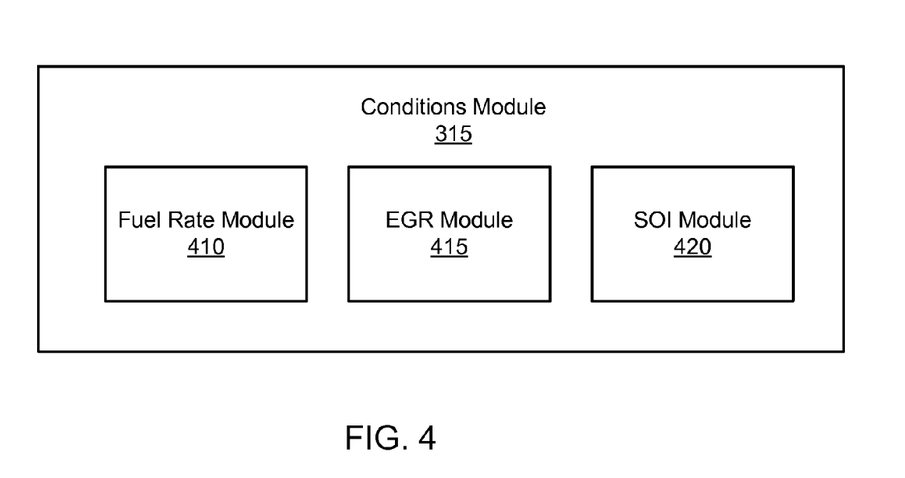
FIG. 4 is a schematic block diagram illustrating one embodiment of a conditions module used in the control system of FIG. 3.

FIG. 4 shows one embodiment of a conditions module 315 used in the control system 300. The conditions module 315 contains a fuel rate module 410, an exhaust gas recirculation module 415, and a start of injection module 420. In one embodiment, the fuel rate module is configured to determine the fueling rate 210 of the engine 110 by multiplying the total consumed fuel amount per revolution by the engine's RPM rate; the EGR module 415 is configured to determine the EGR fraction 235 by ascertaining the fraction mandated for the engine by the controller 330; and the SOI module 420 is configured to determine the injection timing 265 by ascertaining the injection timing 265 mandated for the engine by the controller 330.

Figure 5:
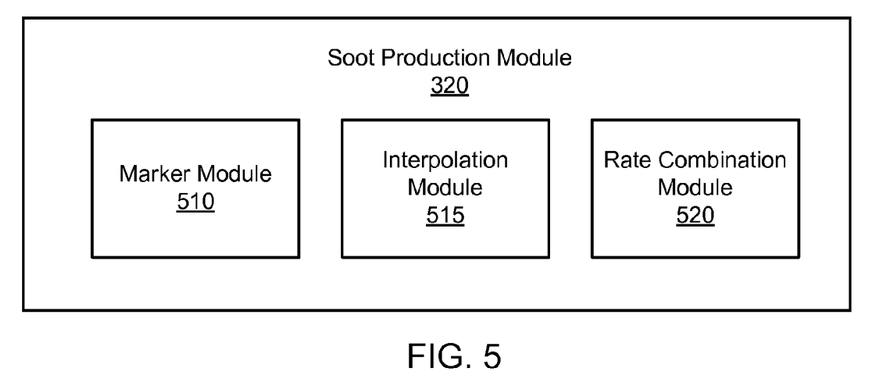
FIG. 5 is a schematic block diagram illustrating one embodiment of a soot production module used in the control system of FIG. 3.

FIG. 5 illustrates one embodiment of a soot production module 320, including a marker module 510, an interpolation module 515, and a rate combination module 520. The marker module 510 is configured to calculate a soot production marker, which in one embodiment could be a normalized soot production value 215, based on one or more engine operating conditions. The interpolation module 515 is configured to interpolate between a high soot production rate and a low soot production rate, which in one embodiment constitute the maximum soot production rate and the minimum soot production rate for the particular engine 110, to determine a primary soot production rate, meaning the rate affected by factors relating to the primary combustion event. The rate combination module 520 is configured to combine the primary soot production rate with any secondary soot production rates—that is, soot being produced by events outside the primary combustion event—to determine a combined soot production rate.

Figure 6:
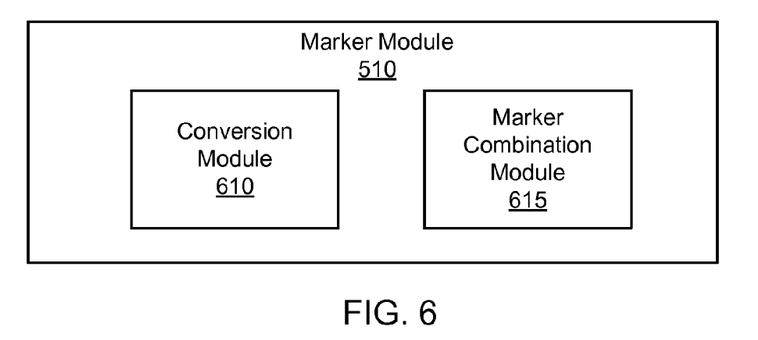
FIG. 6 is a schematic block diagram illustrating one embodiment of a marker module used in the soot production module of FIG. 5.

FIG. 6 illustrates one embodiment of the marker module 510, including a conversion module 610 and a marker combination module 615. The conversion module 610 is configured to convert current individual engine operating conditions to markers such as the normalized soot production values 215a, 215b, and 215c, based on relationship functions such as functions 200, 230, and 260, respectively. The functions may be based on empirical data, theoretical calculations, or both. The marker combination module 615 is configured to combine the markers to determine a combined marker. Other embodiments of the marker module 510 are possible, such as a module configured to combine engine operating conditions and then assigning a marker according to a combined function of those operating conditions.

Figure 7:
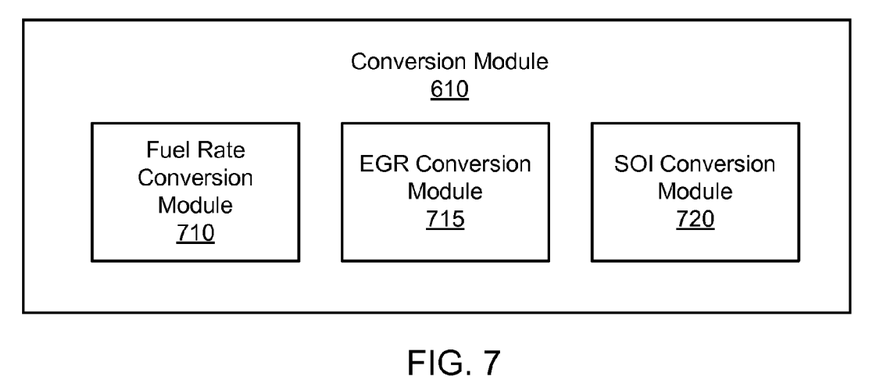
FIG. 7 is a schematic block diagram illustrating one embodiment of a conversion module used in the marker module of FIG. 6.

FIG. 7 illustrates one embodiment of the conversion module 610 according to the invention that uses the three engine operating conditions discussed in relation to FIGS. 2A, 2B, and 2C, i.e., the fuel rate 210, EGR fraction 235, and SOI or injection timing 265. The conversion module 610 includes a fuel rate conversion module 710, an EGR conversion module 715, and an SOI conversion module 720. The fuel rate conversion module 710 converts the engine 110's fueling rate 210 to a marker, in this case the normalized soot production rate 215a, according to the function 200. The EGR conversion module 715 converts the engine 110's EGR fraction 235 to the normalized soot production rate 215b according to the function 230. The SOI conversion module 720 converts the engine 110's injection timing 265 to the normalized soot production rate 215c according to the function 260.

Figure 8:
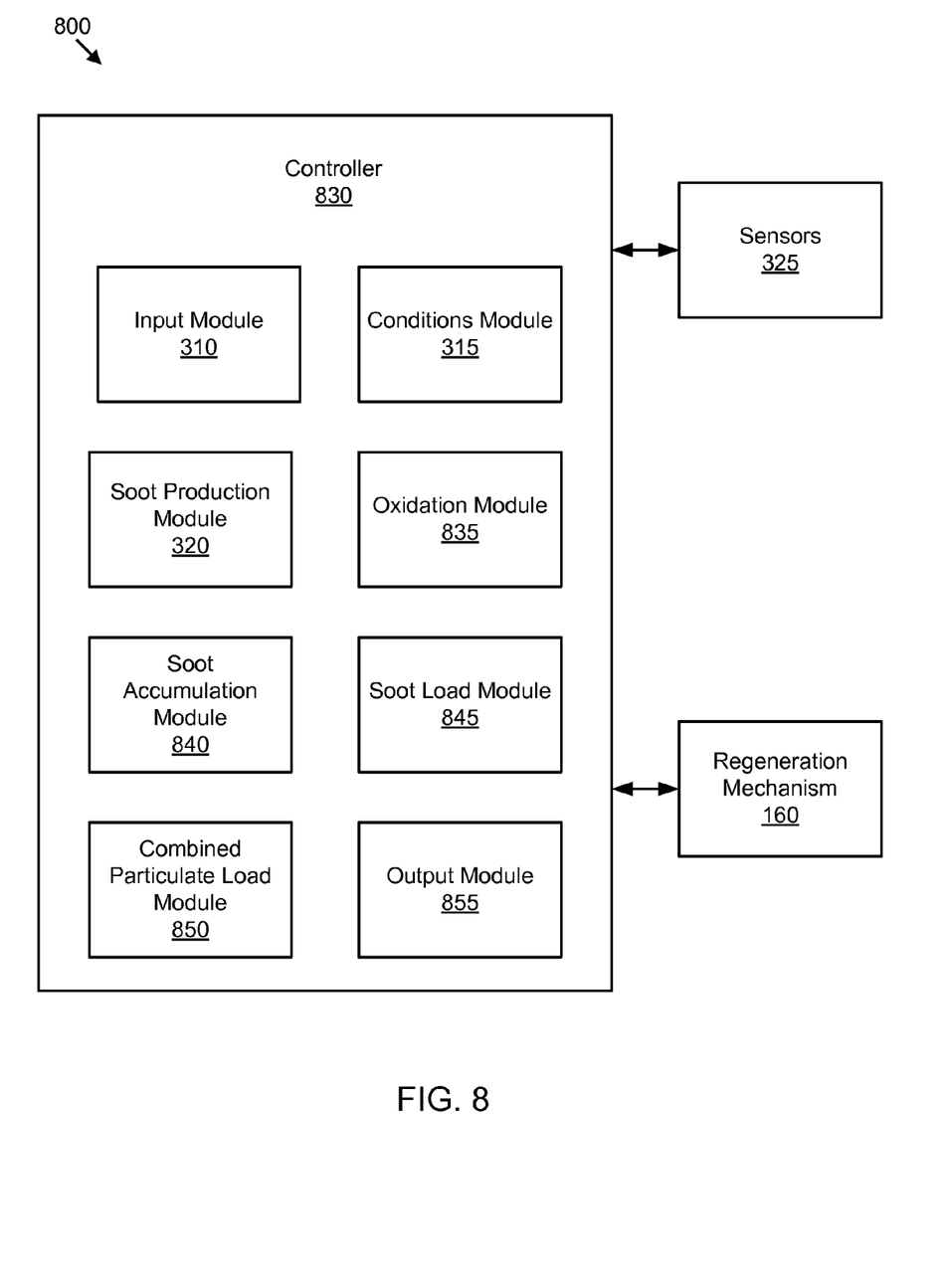
FIG. 8 is a schematic block diagram illustrating another embodiment of a control system according to the present invention.

FIG. 8 illustrates another embodiment of a control system 800 according to the present invention. The control system 800 includes a controller 830, the sensors 325, and the regeneration mechanism 160. As in the control system 300, the sensors 325 are configured to sense one or more operating conditions of the engine 110 and communicate data to the controller. The regeneration mechanism 160 is configured to initiate regeneration of the diesel particulate filter 150 according to commands issued by the controller 830.

The controller 830 comprises an input module 310, conditions module 315, and soot production module 320, configured similarly to their modular counterparts in the control system 300. The controller 830 further contains an oxidation module 835, a soot accumulation module 840, a soot load module 845, a combined particulate load module 850, and an output module 855.

The oxidation module 835 is configured to determine the rate of soot oxidation occurring on the filter 150, as further detailed in related patent application Ser. No. 11/227,403, "APPARATUS, SYSTEM, AND METHOD FOR ESTIMATING PARTICULATE CONSUMPTION," incorporated herein by reference. Oxidation occurring on the filter 150, either initiated by the controller 830 or occurring spontaneously, removes soot from the filter. The soot accumulation module 840 is configured to combine the soot production rate and the oxidation rate to determine a soot accumulation rate, i.e., the rate at which soot is accumulating on the filter through the combination of soot production and oxidation. In one embodiment, this is done by subtracting the oxidation rate from the soot production rate.

The soot load module 845 is configured to estimate the total soot or particulate load on the filter 150, i.e., the total accumulation of particulate on the filter. This can be carried out as detailed in related patent application Ser. No. 11/227,828, "APPARATUS, SYSTEM, AND METHOD FOR ESTIMATING ASH ACCUMULATION," and, "APPARATUS, SYSTEM, AND METHOD FOR PROVIDING COMBINED SENSOR AND ESTIMATED FEEDBACK," each of which are incorporated herein by reference. The rate of ash accumulation on the filter is negligible for practical purposes in many embodiments as compared to the rate of soot accumulation, and in the early stages of the life of the filter 150 total ash accumulation can also be negligible. But as the filter gets older and the ash accumulation load increases, total soot accumulation estimates can become increasingly inaccurate without taking ash accumulation into account. The differential pressure-based load estimate detailed in the above applications does so. Even when the ash accumulation is significant, however, the ash accumulation rate in most cases is insignificant, and estimates of soot accumulation rate remain effective if those rate estimates are independent from the differential pressure value.

The combined particulate load module 850 combines the soot accumulation rate and particulate load to determine a combined particulate load estimate, as detailed in related application Ser. No. 11/227,060, "APPARATUS, SYSTEM, AND METHOD FOR DETERMINING AND IMPLEMENTING ESTIMATE RELIABILITY," incorporated herein by reference. The output module 855 is configured to compare the combined particulate load estimate to a determined value and, based on that comparison, determine whether to instruct the regeneration mechanism 160 to initiate regeneration of the filter 150. Generally, the output module 855 will initiate regeneration if the combined particulate load estimate exceeds the determined value, indicating that the filter 150's particulate load is excessive and must be reduced through regeneration.

Figure 9:
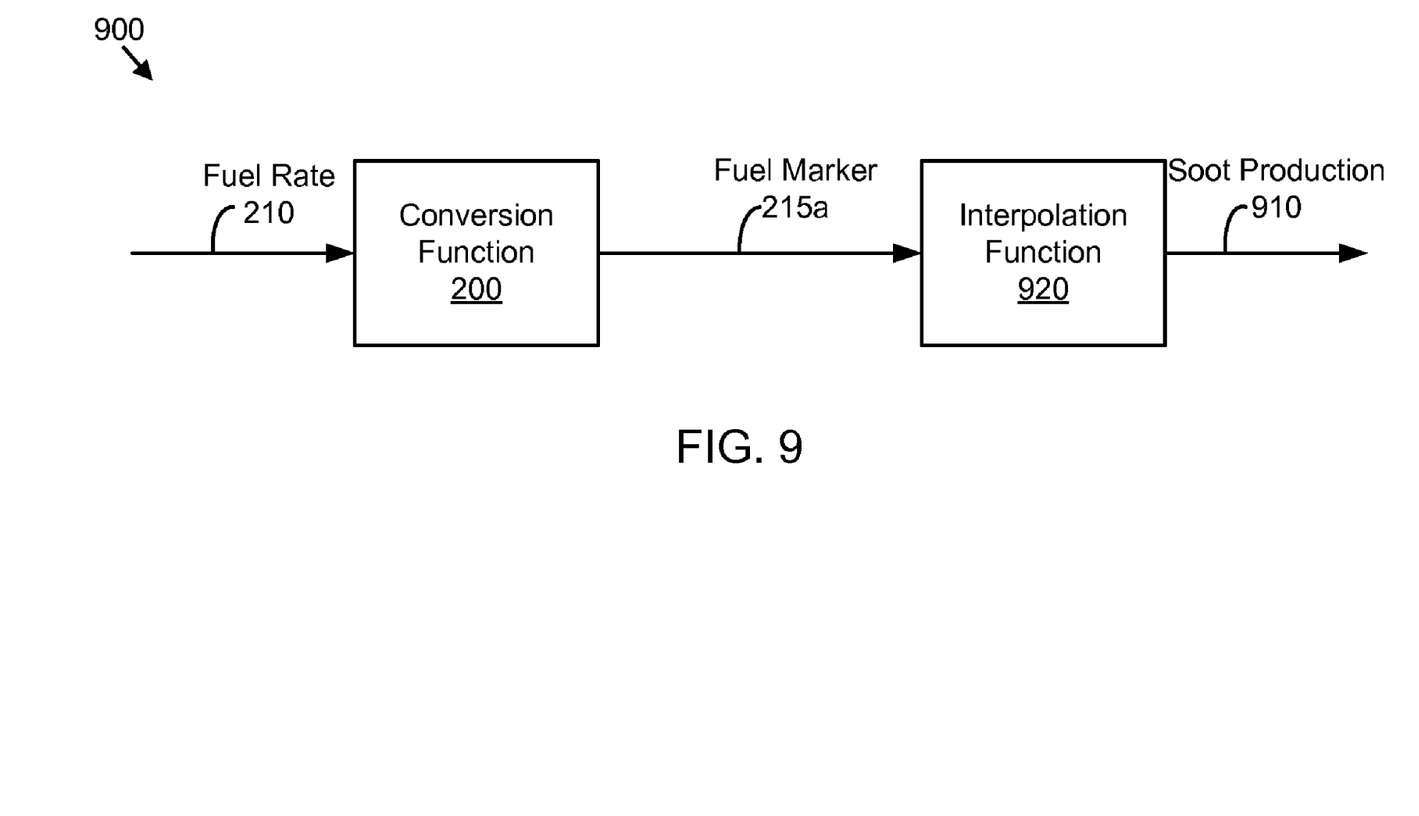
FIG. 9 is a chart illustrating one embodiment of a method of estimating particulate output according to the present invention.

FIG. 9 illustrates a method 900 of estimating soot production on the filter 150 according to the present invention, using as input a single engine condition. In the method 900, the conditions module 315 determines an engine fuel rate value 210. The marker module 510 assigns a marker such as a normalized soot production value 215a to the fuel rate 210 according to a conversion function such as the function 200, and the interpolation module 515 determines a soot production rate 910 according to an interpolation function 920. In one embodiment, if the marker is the normalized soot production value 215a, the interpolation function 920 assigns the engine 110's maximum soot production rate to a normalized value of 1.0 and the minimum soot production rate to a normalized value of 0 and interpolates between the maximum and minimum by multiplying the marker 215a with the maximum soot production rate to determine the soot production rate 910. Other interpolation functions will be apparent to those skilled in the art in light of this disclosure.

Figure 10:
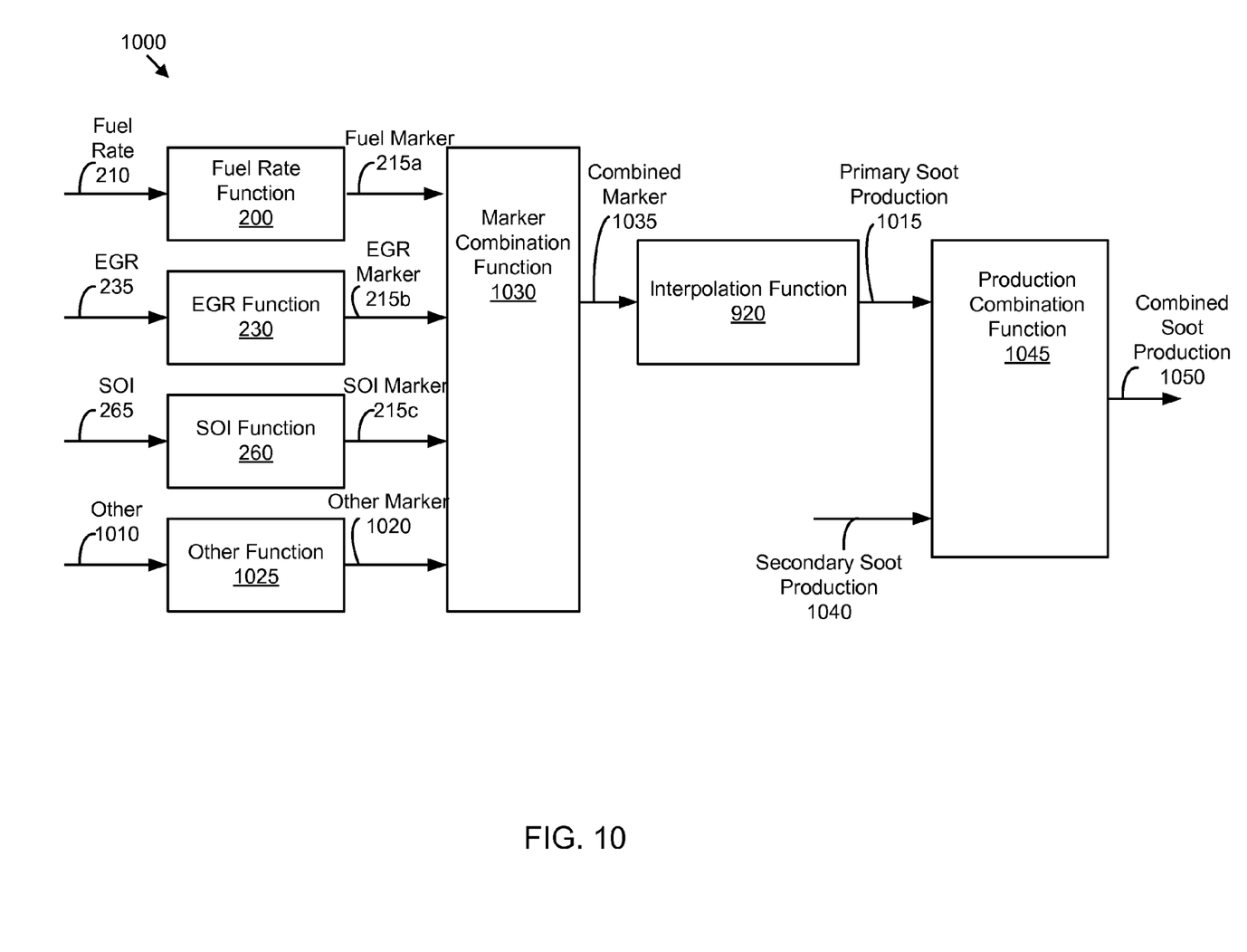
FIG. 10 is a chart illustrating another embodiment of a method of estimating particulate output according to the present invention.

FIG. 10 illustrates another embodiment of a method 1000 of estimating soot production on the filter 150 according to the present invention, using a plurality of engine operating condition inputs. In the method 1000, the fuel rate conditions module 410 determines a fuel rate 210, and the fuel rate conversion module 710 assigns a soot production marker 215a to the fuel rate 210 according to the function 200. The EGR conditions module 415 determines an EGR fraction 235, and the EGR conversion module 715 assigns a soot production marker 215b to the EGR fraction 235 according to the function 230. The SOI conditions module 420 determines an SOI or injection timing value 265, and the SOI conversion module 720 assigns a soot production marker 215c to the SOI value 265 according to the function 260. The conditions module 315 determines the status of any other engine condition or conditions 1010 for which sufficient data has been gathered or calculations carried out to be useful in calculating a primary soot production rate 1015, and the conversion module 610 assigns a soot production marker 1020 to the other condition or conditions 1010.

The marker combination module 615 then combines the soot production markers 215a, 215b, 215c, and 1020 according to a marker combination function 1030 to determine a combined marker 1035. In one embodiment, when the markers 215a, 215b, 215c, and 1020 are normalized soot production values, the marker combination function consists of simply multiplying the markers 215a, 215b, 215c, and 1020 together.

Using the interpolation function 920, the interpolation module 515 then interpolates between a high and low particulate production rate according to the combined marker 1035, as detailed above with regard to FIG. 9, to determine the primary soot production rate 1015. The rate combination module 520 then combines the primary soot production rate 1015 with any secondary soot production rate 1040 using a production combination function 1045. In one embodiment, a secondary soot production rate 1040 may arise from very late post fuel injection (extremely retarded fuel injection timing) or other event that generates soot or other particulate apart from the primary combustion event. In one embodiment, the production combination function 1045 comprises adding the primary and secondary production rates 1015 and 1040 together to determine a combined soot production rate 1050. The secondary soot production rate 1040 may be zero.

The schematic flow chart diagrams that follow, as well as the preceding method schematic diagrams, are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 11:
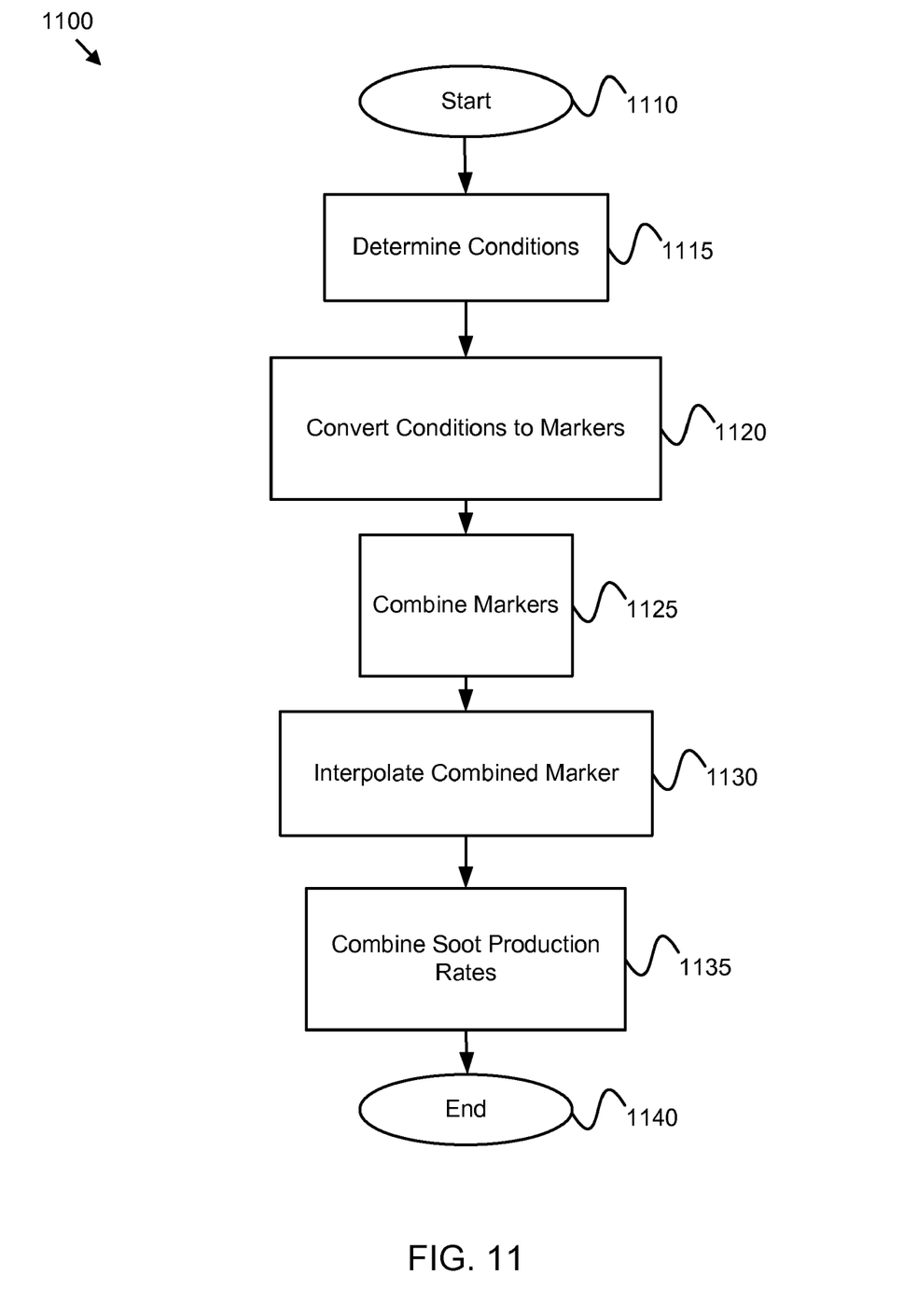
FIG. 11 is a schematic flow chart diagram illustrating an embodiment of a method of estimating particulate output according to the present invention.

FIG. 11 illustrates one embodiment of a method 1100 of estimating a rate of particulate production from an engine 110. The method 1100 begins 1110, and, in one embodiment, the conditions module 315 determines the status 1115 of one or more engine conditions, using data that the input module 310 has gathered from the sensors 325 and/or condition parameters that the controller 330 imposes on the engine system 100. The conversion module 610 assigns soot production markers 1120 to the engine conditions according to functions such as functions 200, 230, and 260 derived from empirical data or theoretical calculations, or both. The marker combination module 615 combines the markers 1125, in one embodiment, by multiplying them together to create a combined marker. The interpolation module 515 interpolates between a minimum particulate production rate and a maximum particulate production rate 1130, in one embodiment, by multiplying the combined marker with the maximum production rate to determine a primary production rate. The rate combination module 520 combines the primary particulate production rate with any secondary particulate production rate 1135 to determine a combined particulate production rate or production rate estimate, and the method 1100 ends 1140.

Figure 12:
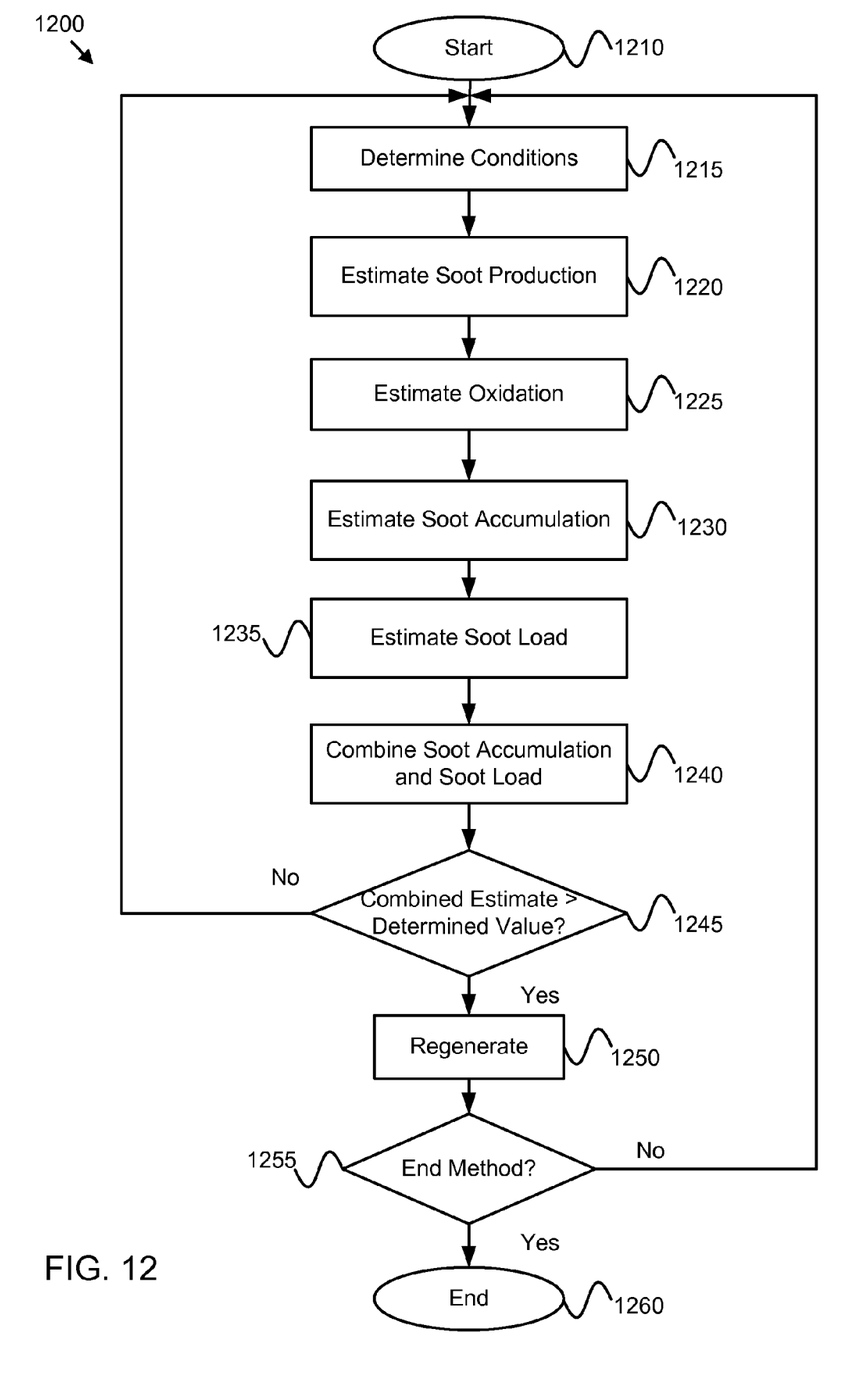
FIG. 12 is a schematic flow chart diagram illustrating one embodiment of a method of determining when to initiate regeneration of a diesel particulate filter according to the present invention.

FIG. 12 illustrates one embodiment of a method 1200 of determining whether to regenerate a diesel particulate filter such as the filter 150. The method 1200 begins 1210, and the conditions module 315 determines one or more engine operating conditions 1215 as described above in connection with FIG. 11. The soot production module 320 estimates a soot production rate 1220, as described above in connection with FIG. 11. The oxidation module 835 determines 1225 an estimated rate of oxidation of particulate on the filter 150, and the soot accumulation module 840 estimates particulate accumulation 1230 on the filter 150 by, in one embodiment, subtracting the oxidation rate from the particulate production rate. The soot load module 845 estimates 1235 the total particulate load on the filter 150, which may include both soot and ash, and the combined particulate load module 850 combines particulate accumulation and particulate load 1240 to determine a combined particulate load estimate. While the controls can be run without accounting for ash, the system in that case is accepting an increasing fuel-economy penalty as the regenerations trigger with less soot on the filter 150 (as compared to ash).

The output module 855 then determines 1245 whether the combined particulate load estimate exceeds a determined value. If no, in one embodiment, the method begins again. If yes, the output module 855 instructs the regeneration mechanism 160 to initiate regeneration 1250 of the filter 150. The controller 830 then determines 1255 whether to end the method 1200. If no, the method 1200 begins again. If yes, the method 1200 ends 1260. In one embodiment, the method 1200 continues to be performed during regeneration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to estimate the rate of particulate produced from an engine, the apparatus comprising:
   a conditions module, the conditions module configured to determine the status of at least one engine operating condition;
   a marker module, the marker module configured to determine a particulate production marker corresponding to the operating condition status; and
   an interpolation module, the interpolation module configured to interpolate between a high particulate production rate of the engine and a low particulate production rate of the engine according to the particulate production marker, thereby estimating the engine's rate of particulate production;
   wherein the marker module is configured to determine a plurality of particulate production markers based on a plurality of engine operating conditions, and further comprising a marker combination module, the marker combination module configured to combine the particulate production markers into a combined marker, and wherein the interpolation module is configured to interpolate between the high particulate production rate and the low particulate production rate according to the combined marker to determine a primary particulate production rate.

2. The apparatus of claim 1, wherein the particulate production marker comprises a normalized particulate production rate.

3. The apparatus of claim 1, wherein the high particulate production rate is the engine's maximum particulate production rate, and the low particulate production rate is the engine's minimum particulate production rate.

4. The apparatus of claim 1, wherein the particulate production markers comprise normalized particulate production rates, and wherein the marker combination module is configured to multiply the particulate production markers together.

5. The apparatus of claim 1, wherein the engine condition comprises the engine's fueling rate.

6. The apparatus of claim 1, wherein the engine conditions comprise the engine's fueling rate, exhaust gas recirculation fraction, and fuel injection timing.

7. The apparatus of claim 1, further comprising a rate combination module configured to combine the primary particulate production rate with a secondary particulate production rate to determine a combined particulate production rate.

8. The apparatus of claim 7, wherein the rate combination module is configured to add the primary particulate production rate to the secondary particulate production rate.

9. An apparatus to estimate the rate of particulate produced from an engine, the apparatus comprising:
   a conditions module, the conditions module configured to determine the status of at least one engine operating condition;
   a marker module, the marker module configured to determine a particulate production marker corresponding to the operating condition status;
   an interpolation module, the interpolation module configured to interpolate between a high particulate production rate of the engine and a low particulate production rate of the engine according to the particulate production marker, thereby estimating the engine's rate of particulate production; and
   an exhaust mechanism operatively connected to the engine, the exhaust mechanism comprising a particulate filter and a regeneration mechanism configured to regenerate the filter, and wherein the apparatus further comprises an oxidation module configured to estimate the rate of oxidation of particulate matter on the filter, a particulate accumulation module configured to calculate a particulate accumulation rate by combining the rate of particulate production and the rate of oxidation, a particulate load module configured to estimate the load of particulate on the filter, a combined particulate load module configured to generate a combined particulate load estimate by combining the particulate accumulation rate and the particulate load, and an output module configured to direct the regeneration mechanism to initiate regeneration of the filter according to the combined particulate load estimate.

10. A method for estimating the rate of particulate produced by a diesel engine, the method comprising:
    determining the status of at least one engine operating condition;
    determining a particulate production marker corresponding to the engine operating condition status; and
    interpolating between a high particulate production rate and a low particulate production rate as a function of the particulate production marker to determine a particulate production rate;
    wherein determining the particulate production marker comprises determining a plurality of particulate production markers, each particulate production marker comprising a function of the status of one engine operating condition, the method further comprising determining a combined marker by combining the particulate production markers, and wherein interpolating between the high and low particulate production rates comprises interpolating according to the combined marker.

11. The method of claim 10, wherein determining the particulate production marker comprises using a relationship function between the condition status and the rate of engine particulate production.

12. The method of claim 10, wherein determining the particulate production marker comprises using a relationship function between the engine operating condition and the rate of engine particulate production, and wherein interpolating between the high and low particulate production rates comprises interpolating between a high particulate production rate corresponding to the engine's maximum particulate production rate, and a low particulate production rate corresponding to the engine's minimum particulate production rate.

13. The method of claim 10, wherein combining the particulate production markers comprises multiplying the production markers with one another.

14. The method of claim 10, wherein determining a particulate production marker comprises determining a normalized particulate production rate.

15. The method of claim 10, further comprising combining a secondary particulate production rate with the particulate production rate to determine a combined particulate production rate.

16. The method of claim 15, wherein combining the particulate production rate and the secondary particulate production rate comprises adding the production rate to the secondary production rate.

17. The method of claim 10, further comprising determining the oxidation rate of particulate on a particulate filter operatively connected to the engine and subtracting the oxidation rate from the production rate to determine a particulate accumulation rate.

18. The method of claim 17, further comprising estimating the particulate load on the filter, combining the accumulation rate with the particulate load to determine a combined particulate load estimate, and initiating regeneration of the filter according to the combined particulate load estimate.

19. The method of claim 18, wherein estimating the particulate load comprises estimating the particulate load as a function of differential pressure across the filter.

20. A signal bearing medium tangibly embodying a program of machine-readable instructions executable by a digital processing apparatus to perform operations to estimate the rate of particulate produced by a diesel engine, the operations comprising:
  determining the status of at least one engine operating condition;
  determining a particulate production marker corresponding to the engine operating condition status; and
  interpolating between a high particulate production rate and a low particulate production rate as a function of the particulate production marker to determine a particulate production rate;
  wherein the operation of determining a particulate production marker comprises determining a plurality of particulate production markers, each particulate production marker comprising a function of the status of one engine operating condition, the instructions further comprising the operation of determining a combined marker by combining the particulate production markers, and wherein interpolating between the high and low particulate production rate comprises interpolating according to the combined marker.

21. A signal bearing medium tangibly embodying a program of machine-readable instructions executable by a digital processing apparatus to perform operations to estimate the rate of particulate produced by a diesel engine, the operations comprising:
  determining the status of at least one engine operating condition;
  determining a particulate production marker corresponding to the engine operating condition status;
  interpolating between a high particulate production rate and a low particulate production rate as a function of the particulate production marker to determine a particulate production rate;
  determining the oxidation rate of particulate on a particulate filter operatively connected to the engine and subtracting the oxidation rate from the particulate production rate to determine a particulate accumulation rate;
  estimating the particulate load on the filter;
  combining the accumulation rate with the particulate load to determine a combined particulate load estimate; and
  initiating regeneration of the filter according to the combined particulate load estimate.

22. A diesel engine and exhaust system, the system comprising:
  a diesel engine;
  an exhaust system operatively connected to the engine, the exhaust system comprising a diesel particulate filter; and
  a controller, the controller comprising:
    a conditions module configured to determine the status of at least one engine operating condition; and
    a particulate production module comprising a marker module, the marker module configured to determine a marker denoting engine particulate production as a function of the engine operating condition status, the particulate production module further comprising an interpolation module, the interpolation module configured to interpolate between a high particulate production rate and a low particulate production rate according to the particulate production marker to determine a primary particulate production rate;
  wherein the marker module is configured to determine a plurality of particulate production markers based on a plurality of engine operating conditions, and further comprising a marker combination module, the marker combination module configured to combine the particulate production markers into a combined marker, and wherein the interpolation module is configured to interpolate between the high particulate production rate and the low particulate production rate according to the combined marker to determine a primary particulate production rate.

23. A diesel engine and exhaust system, the system comprising:
  a diesel engine;
  an exhaust system operatively connected to the engine, the exhaust system comprising a diesel particulate filter; and
  a controller, the controller comprising:
    a conditions module configured to determine the status of at least one engine operating condition; and
    a particulate production module comprising a marker module, the marker module configured to determine a marker denoting engine particulate production as a function of the engine operating condition status, the particulate production module further comprising an interpolation module, the interpolation module configured to interpolate between a high particulate production rate and a low particulate production rate according to the particulate production marker to determine a primary particulate production rate;
  wherein the exhaust system further comprises a regeneration mechanism configured to regenerate the filter, and wherein the controller further comprises an oxidation module configured to estimate the rate of oxidation of particulate matter on the filter, a particulate accumulation module configured to calculate a particulate accumulation rate by combining the particulate production rate and the rate of oxidation, a particulate load module configured to estimate the load of particulate on the filter, a combined particulate load module configured to generate a combined particulate load estimate by combining the particulate accumulation rate and the particulate load, and an output module configured to direct the regeneration mechanism to initiate regeneration of the filter according to the combined particulate load estimate.

* * * * *